US007103768B2

(12) United States Patent
Narita et al.

(10) Patent No.: US 7,103,768 B2
(45) Date of Patent: Sep. 5, 2006

(54) INFORMATION PROVIDING METHOD, INFORMATION PROVIDING SYSTEM AND PROGRAM

(75) Inventors: Izuru Narita, Yamato (JP); Yoshihiko Terashita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 10/171,196

(22) Filed: Jun. 12, 2002

(65) Prior Publication Data

US 2002/0199097 A1 Dec. 26, 2002

(30) Foreign Application Priority Data

Jun. 20, 2001 (JP) ............................. 2001-186170

(51) Int. Cl.
*H04L 9/00* (2006.01)

(52) U.S. Cl. ........................... 713/150; 705/53; 705/74

(58) Field of Classification Search ................ 713/150, 713/182, 186; 705/51, 53, 77, 78, 79, 74; 726/26, 28
See application file for complete search history.

(56) References Cited

U.S. PATENT DOCUMENTS

| 6,148,342 | A | * | 11/2000 | Ho ............................. 709/225 |
| 6,654,724 | B1 | * | 11/2003 | Rubin et al. ................... 705/3 |
| 2001/0054155 | A1 | * | 12/2001 | Hagan et al. ............... 713/193 |
| 2003/0074564 | A1 | * | 4/2003 | Peterson ..................... 713/182 |

FOREIGN PATENT DOCUMENTS

| JP | 01-272336 | 10/1989 |
| JP | 10-340255 | 12/1998 |
| JP | 11-328117 | 11/1999 |

\* cited by examiner

*Primary Examiner*—Matthew Smithers
(74) *Attorney, Agent, or Firm*—Duke W. Yee; Gerald R. Woods; Theodore D. Fay, III (57) ABSTRACT

A user 100 makes an inquiry through a billing institution 103 to a gene analyzing institution 104 retaining gene analysis information, and the billing institution 103 transfers the gene analysis information received from the gene analyzing institution 104 to the user 100 using a routing address that was dynamically set. The gene analysis information is encrypted at the gene analyzing institution 104 in such a way that decryption at the billing institution 103 is infeasible. Since the gene analyzing institution 104 cannot identify the user 100, and the billing institution 103 cannot know the content of the gene analysis information, privacy of the user 100 can thus be protected.

22 Claims, 9 Drawing Sheets

INFORMATION PROVIDING METHOD, INFORMATION PROVIDING SYSTEM AND PROGRAM

FIELD OF THE INVENTION

The present invention relates to a technique of allowing an individual to obtain his/her personal information while remaining anonymous, and more particularly to a technique of allowing an individual to obtain his/her gene analysis information through the Internet while remaining anonymous.

BACKGROUND ART

Recently, analysis of human genes has been making progress. To date, not all the detailed information included in genes has been revealed yet. However, it is expected that when the analysis of human genes makes further progress and researches on relationships with diseases or diatheses are advanced, medical information, such as genetic diseases or diatheses, will become available with high reliability.

It is also expected that medical practices, such as prevention of genetic diseases or diseases linked to genetic abnormalities, treatments of these diseases, and preventive measures to delay the onsets of these diseases, will be carried out by using the analyzed genetic information (hereinafter, referred to as gene analysis information). In addition, genes include diathetic and physical information of an individual, and, therefore, utilization of such information in his/her daily life and health care is anticipated.

However, gene analysis information of an individual concerns his/her privacy, and permitting a third party to know the content thereof poses a serious problem in terms of privacy protection.

To protect privacy with regard to genes, there is a method of prohibiting a gene analyzing institution from leaking gene analysis information to any third party. The results of medical checkups or the like are generally managed by this method. According to this method, however, the institution conducting the gene analysis holds both the personal information, such as a name and an address, and the gene analysis information of an individual, which raises concern over possible information leakage. Also, this method has an unsolved problem that both the personal information and the gene analysis information are revealed to others even in a closed group of people. In other words, there remains a problem that particular people can identify an individual with respect to the gene analysis information. Hence, a user applied for the gene analysis may still fear that the privacy protection is not ensured.

SUMMARY OF THE INVENTION

The present invention aims to provide an information providing method for allowing a user to obtain information which the user wishes to keep confidential while protecting user's privacy. Also, the invention aims to provide an information providing method for making it impossible for a third party to relate a user to the content of gene analysis information and an associated service that the user has received. Further, the invention aims to provide an information providing system for implementing these methods. Furthermore, the invention aims to provide a computer-executable program for implementing these methods by a computer.

The following description will describe the summary of the invention disclosed in the present application. That is, the invention provides an information providing method implemented by an information providing system including a user who is to be provided with information, an information providing institution for providing the information, and a relay institution for relaying a communication between the user and the information providing institution, which method includes the steps of receiving an inquiry about the information from the user at the relay institution, selecting a routing address from a plurality of addresses which the relay institution and the information providing institution have agreed on in advance, transmitting user specific information from the user to the information providing institution via the routing address of the relay institution, selecting the information corresponding to the user specific information in the information providing institution, and transmitting the information from the information providing institution to the user via the routing address, wherein the user specific information is encrypted with a second encryption key corresponding to a second decryption key held at the information providing institution, and the information is encrypted with a first encryption key corresponding to a first decryption key held by the user.

In the above, since the information providing institution receives the user specific information by way of the routing address of the relay institution, and transmits the information to be provided to the user by way of the routing address of the relay institution, the information providing institution cannot know who has requested the provision of information or to whom the information is provided. In addition, both the user specific information transmitted by way of the routing address and the information from the information providing institution are encrypted in which the relay institution does not hold corresponding decryption keys. Hence, the relay institution cannot know the contents of the user specific information and the information from the information providing institution. In addition, since the routing address is selected from a plurality of candidates when an inquiry from the user is received, it is difficult for a third party to relate the user to the routing address, which makes it difficult for a third party to pose as the relay institution in trying to have an access to the information providing institution. In regard to the encryption key and decryption key, the former may be a public key while the latter may be a private or secret key. Alternatively, the both may be a common key.

The invention also provides an information providing method including the steps of receiving user specific information by way of a routing address selected dynamically from a plurality of addresses determined in advance with a relay institution, encrypting information corresponding to the user specific information with a first encryption key corresponding to a first decryption key held by a user, and transmitting the encrypted information to the routing address.

The invention further provides an information providing method including the steps of receiving an inquiry about information from a user, selecting a routing address from a plurality of addresses determined in advance with an information providing institution that provides the information, receiving the information transmitted from the information providing institution at the routing address, and transferring the information received at the routing address to the user.

The information provided from the information providing institution may be privacy information that the user wishes to keep confidential. The privacy information may be medical analysis information, which may include information on gene sequences, information on diseases diagnosed from the gene analysis, information on disorders diagnosed from the gene analysis, information on diatheses and personality revealed from the gene analysis, information on physical characteristics revealed from the gene analysis, information on allergies revealed from the gene analysis, information on aptitude revealed from the gene analysis, etc. Besides the genetic information, also included may be information as to whether an individual has any particular disease, information as to whether an individual has become infected with a particular virus, information on allergies, information on diatheses, information on mentality or psychological inclination, etc. The medical analysis information may also include commentaries and advice on the foregoing information.

The term "dynamically" used herein has a meaning as follows. Firstly, it should be understood that there are a plurality of candidates for the routing address, and which candidate will be used is not determined in advance. Upon receipt of an inquiry from the user about the medical analysis information, the routing address is selected from a plurality of candidates that are not used at that instance. A different routing address must be selected for a user's inquiry received at a different time. Although it is possible that the same address is selected accidentally, it is unpredictable and its probability would be reduced if the number of routing address candidates increases. Thus, the selected routing address varies with the timing of the inquiry from the user, and is, therefore, unpredictable. Such a way of selecting the routing address is referred to as "dynamically".

The information providing method of the invention is applicable in the form of a system or a program.

PREFERRED EMBODIMENTS OF THE INVENTION

The embodiments of the present invention will now be described in detail with reference to the accompanying drawings. It should be appreciated, however, that the invention can be implemented in various manners, and should not limited to the embodiments described below. Also, like components are labeled with like reference numerals in all the embodiments below.

(First Embodiment)

In the present embodiment, a user who is to be provided with gene analysis information receives the same from an institution conducting gene analysis, which also serves as an information providing institution, by way of a relay institution. Since the institution conducting the gene analysis provides the gene analysis information to the user by way of the relay institution, it cannot know personal information of the user, such as his/her address and name. Also, since the gene analysis information handled at the relay institution is encrypted in a way that decryption is infeasible at the relay institution, the relay institution cannot know the content of the gene analysis information. In short, no one but the user can obtain a set of the personal information of the user, such as his/her address and name, and the gene analysis information of the user.

Figure 1:
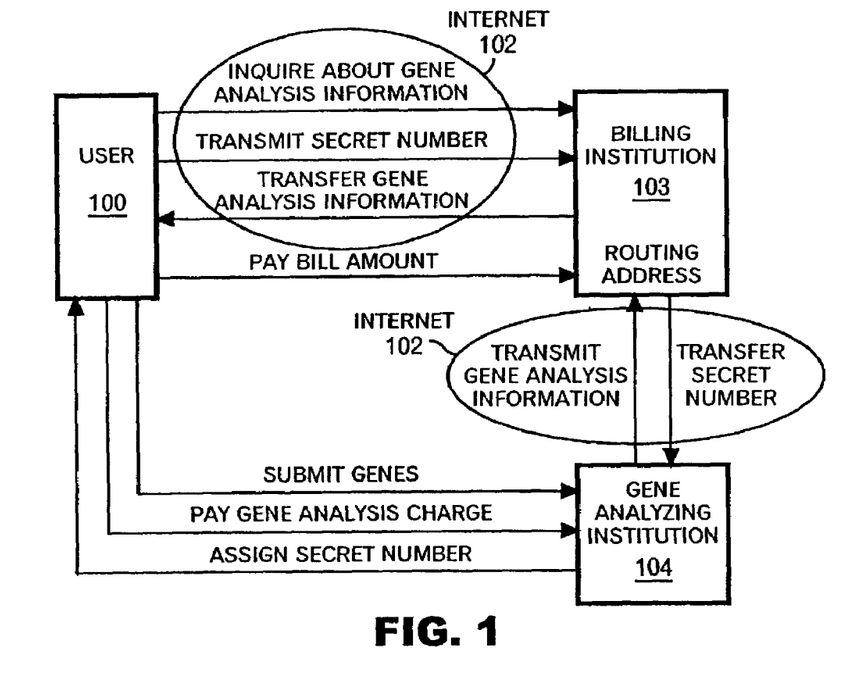
FIG. 1 is a view explaining one example of a gene analysis information providing service using the invention.
Figure 2:
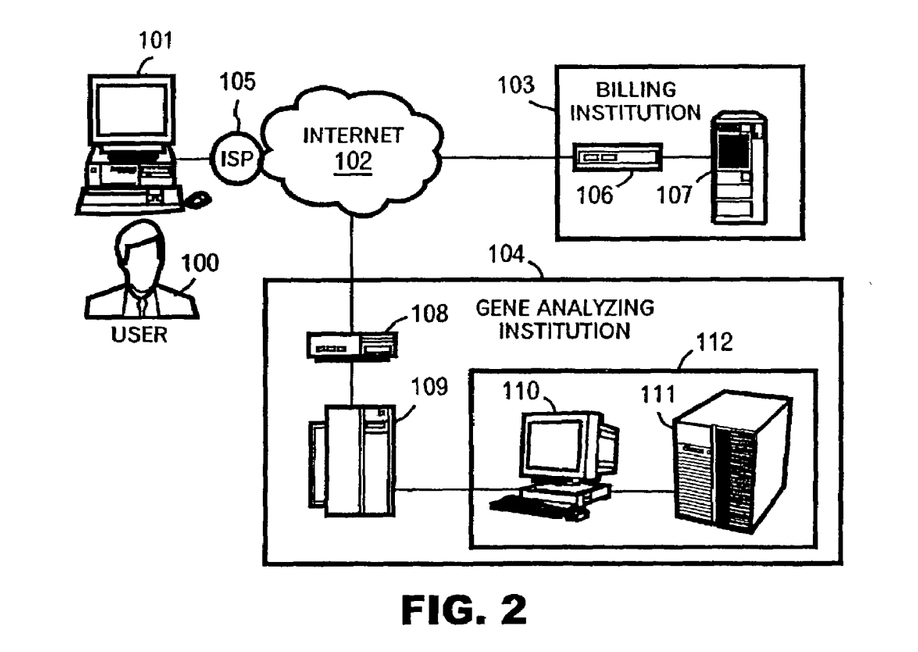
FIG. 2 is another view explaining the example of the gene analysis information providing service using the invention.
Figure 3:
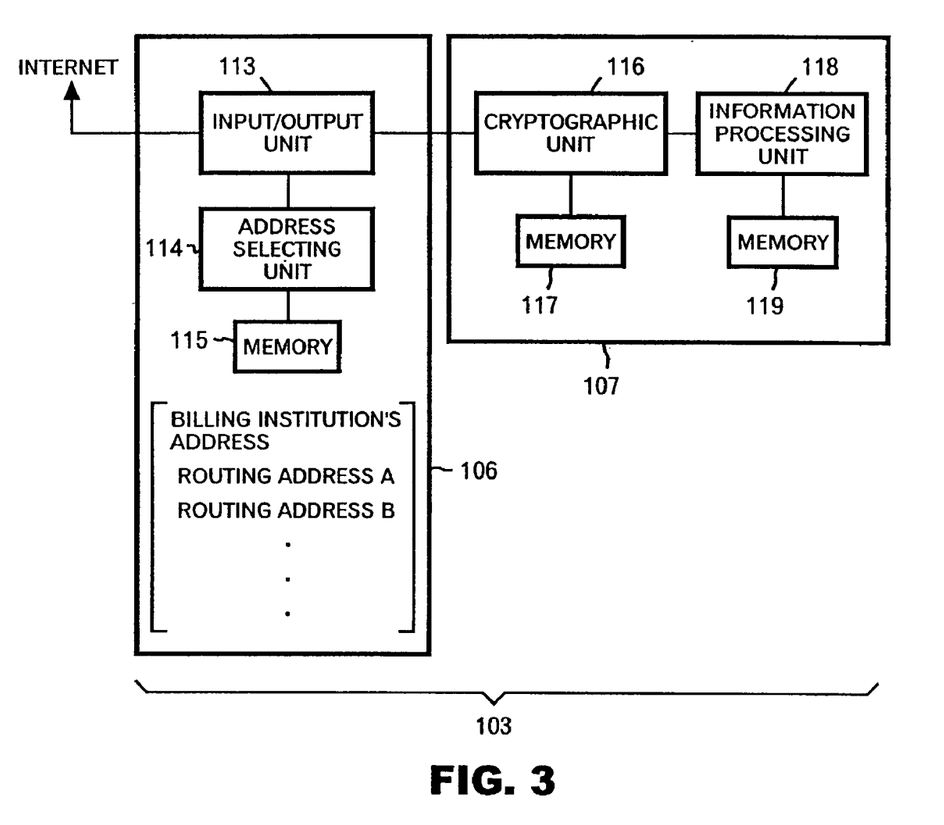
FIG. 3 is a view explaining a billing institution in the example of the gene analysis information providing service using the invention.
Figure 4:
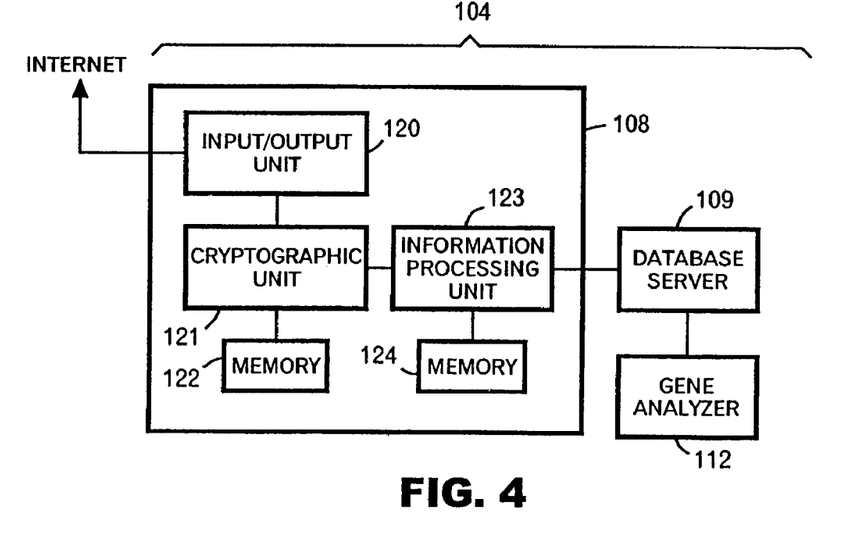
FIG. 4 is a view explaining a gene analyzing institution in the example of the gene analysis information providing service using the invention.

FIG. 1 is a view explaining an example of a gene analysis information providing service using the invention. FIG. 2 is another view explaining the example of the gene analysis information providing service using the invention. FIG. 3 is a view explaining a billing institution in the example of the gene analysis information providing service using the invention. FIG. 4 is a view explaining a gene analyzing institution in the example of the gene analysis information providing service using the invention.

A user 100 can access the Internet 102 from a personal computer 101, which may be owned by the user, through an Internet service provider (ISP) 105.

A billing institution 103 serving as a relay institution obtains the gene analysis information requested by the user 100 from a gene analyzing institution 104, which is an independent institution from the billing institution 103, through the Internet 102, and provides the same to the personal computer 101 of the user 100 through the Internet 102. The billing institution 103 bills the user 100 for an information providing charge. Also, the billing institution 103 dynamically sets a routing address for the gene analyzing institution 104.

The billing institution 103 includes a router 106 and a billing and authentication server 107. The router 106 includes an input/output unit 113 for establishing a connection with the Internet 102 using a predetermined address, an address selecting unit 114 for selecting an address to be used, and a memory 115 for recording addresses selected by the address selecting unit 114. The billing and authentication server 107 has a function of billing and authentication for the user 100. The billing and authentication server 107 includes a cryptographic unit 116 for decrypting encrypted incoming information transmitted through the Internet 102 and encrypting outgoing information to be transmitted through the Internet 102, a memory 117 for recording cryptographic keys necessary for decryption and encryption, an information processing unit 118 for processing information received or transmitted through the Internet 102, and a memory 119 for recording information necessary in the information processing unit 118.

The gene analyzing institution 104, which is an institution for conducting gene analysis that also serves as an institution for providing gene analysis information (information providing institution), includes an access server 108, a database server 109, and a gene analyzing device 112.

The access server 108 includes an input/output unit 120 for establishing a connection with the Internet 102, a cryptographic unit 121 for decrypting encrypted incoming information received through the Internet 102 and encrypting outgoing information to be transmitted through the Internet 102, a memory 122 for recording cryptographic keys necessary for decryption and encryption, an information processing unit 123 for processing information received or transmitted through the Internet 102, and a memory 124 for recording information necessary in the information processing unit 123.

The database server 109 has a function of recording a secret number corresponding to genetic information analyzed by the gene analyzing device 112, and a function of providing the gene analysis information to the access server 108 as needed. Also, the database server 109 records information including commentaries on the gene analysis information, advice on health care, advice on improvement of diathesis, etc.

The gene analyzing device 112 includes an analyzer 111 for obtaining gene analysis information, and a computer 110 for controlling the analyzer 111. The analyzer 111 obtains gene analysis information by analyzing a gene extraction sample (for example, hair or a fragment of tissue).

Figure 5:
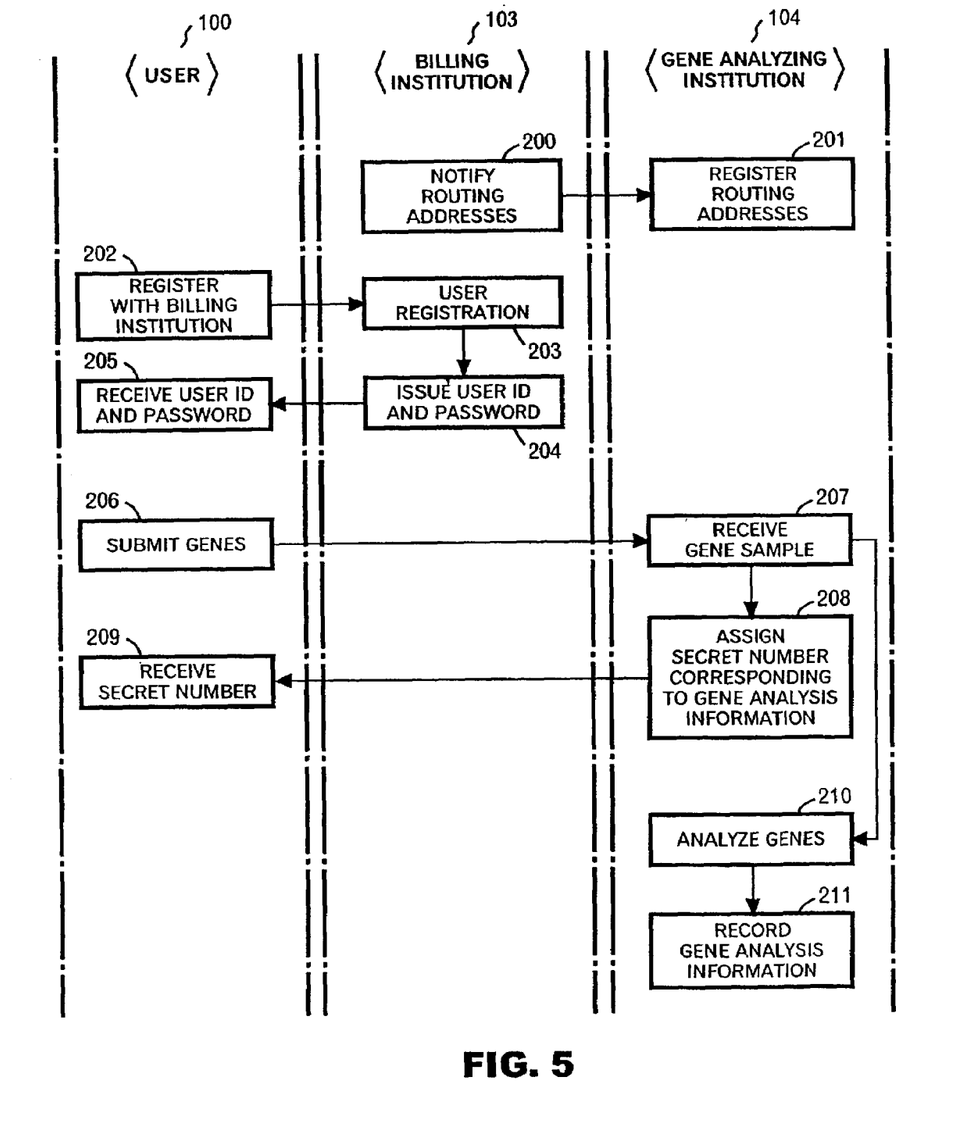
FIG. 5 is a flowchart explaining one embodiment of the gene analysis information providing service using the invention.
Figure 6:
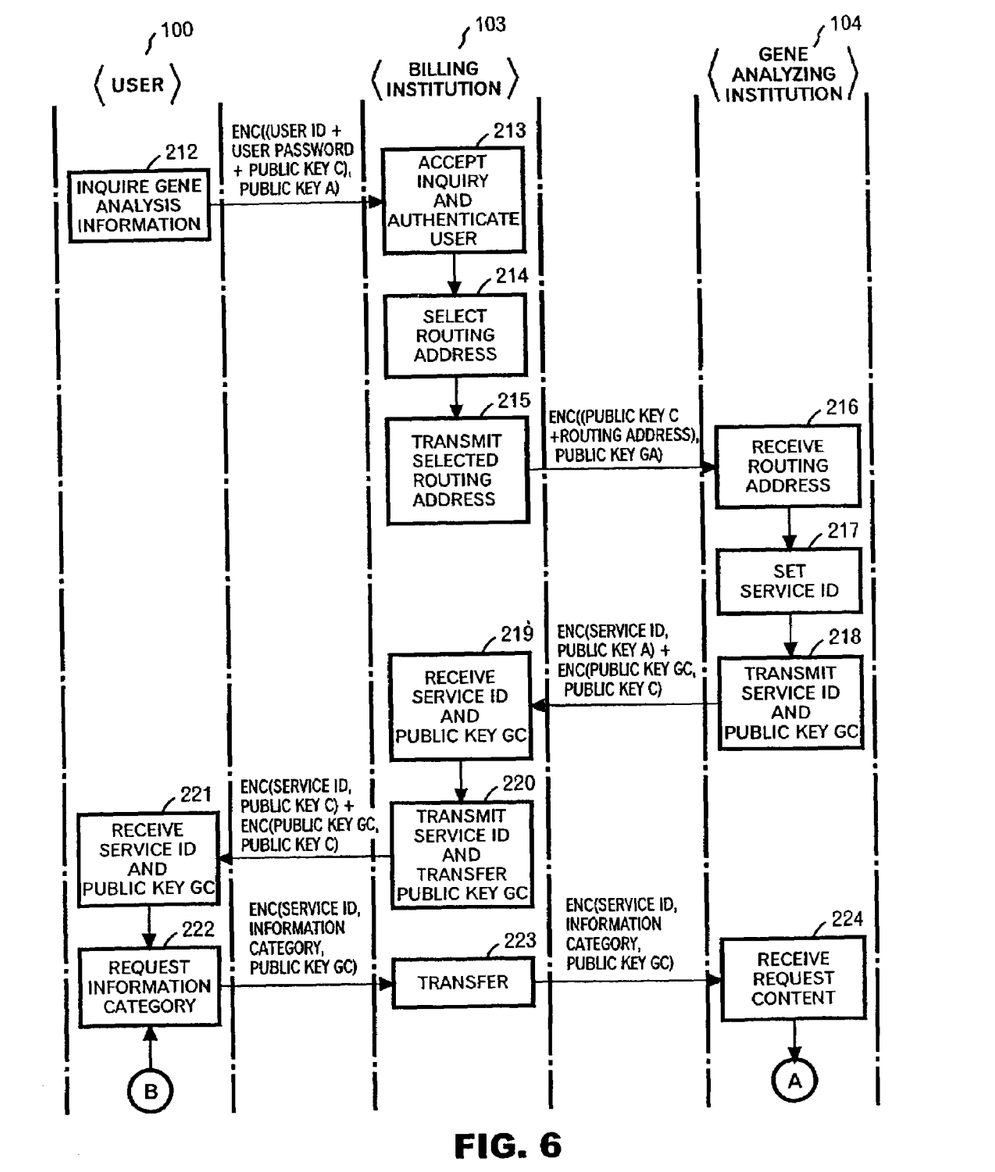
FIG. 6 is a flowchart succeeding FIG. 5 and explaining one embodiment of the gene analysis information providing service using the invention.
Figure 7:
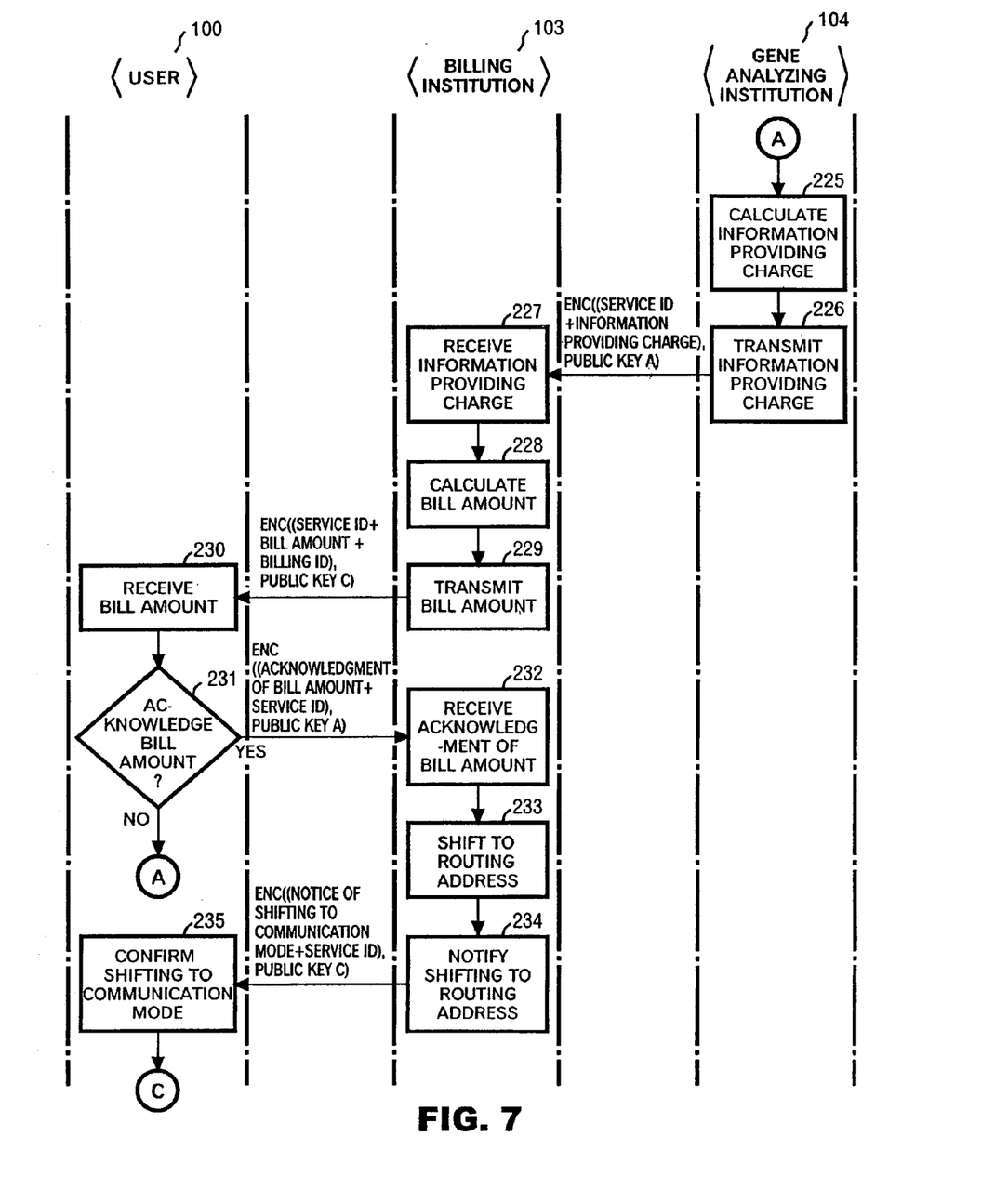
FIG. 7 is a flowchart succeeding FIG. 6 and explaining one embodiment of the gene analysis information providing service using the invention.
Figure 8:
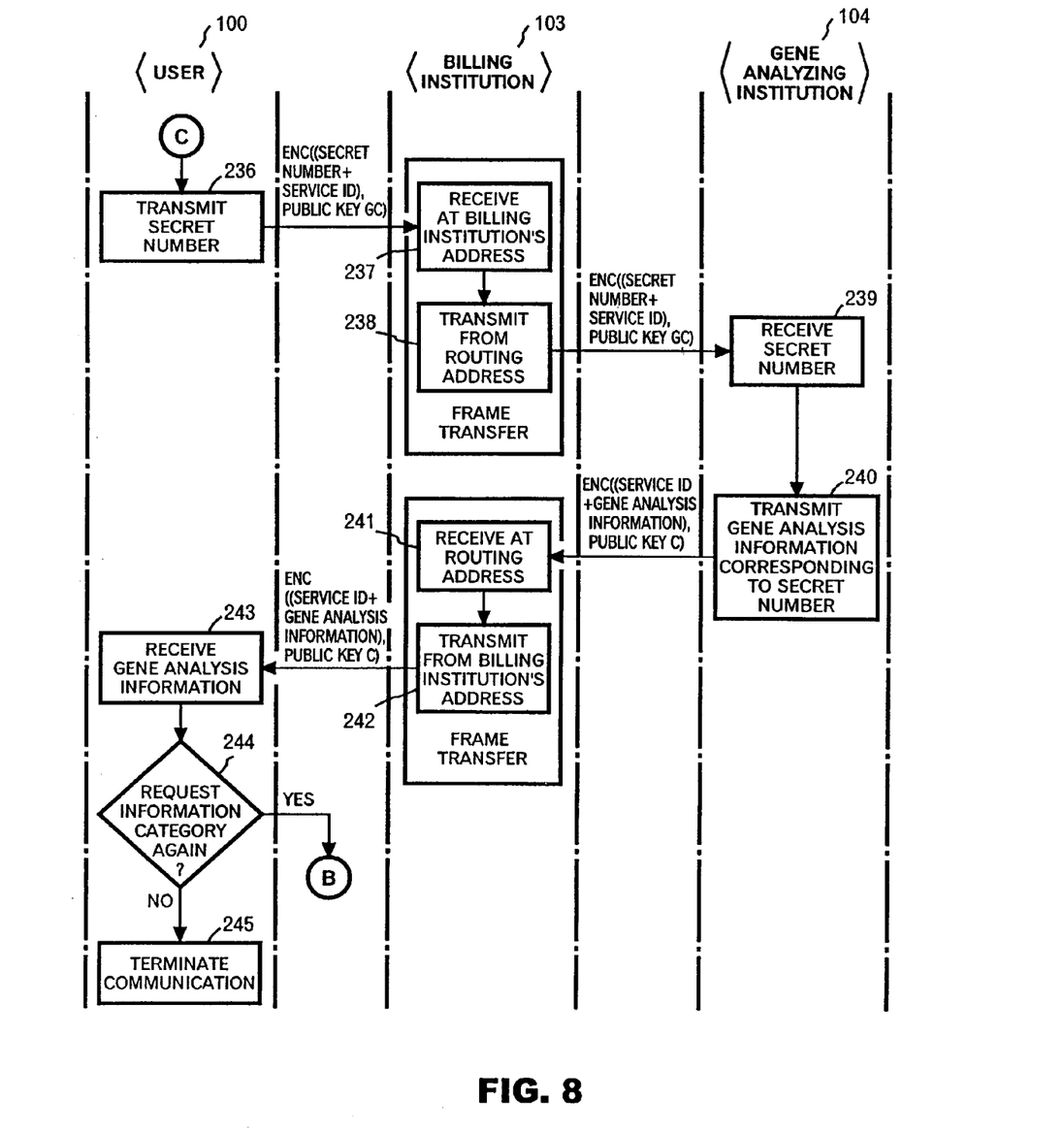
FIG. 8 is a flowchart succeeding FIG. 7 and explaining one embodiment of the gene analysis information providing service using the invention.

Next, an exemplary procedure for the user 100 to obtain his/her gene analysis information through the Internet 102 will be described. FIG. 5 is a flowchart explaining one embodiment of a gene analysis information providing service using the invention. FIG. 6 is a flowchart succeeding FIG. 5 and explaining one embodiment of the gene analysis information providing service using the invention. FIG. 7 is a flowchart succeeding FIG. 6 and explaining one embodiment of the gene analysis information providing service using the invention. FIG. 8 is a flowchart succeeding FIG. 7 and explaining one embodiment of the gene analysis information providing service using the invention.

Initially, in order to implement the gene analysis information providing service, the gene analyzing institution 104 registers routing addresses notified from the billing institution 103, and the user 100 registers with the billing institution 103, and submits a gene sample to the gene analyzing institution 104.

The billing institution 103 notifies the gene analyzing institution 104 of a plurality of routing address candidates used by the billing institution 103 (step 200). The gene analyzing institution 104 registers the notified routing address candidates (step 201). The notified routing addresses are recorded in the memory 124. The notification may be done utilizing the Internet or mailing service. When the billing institution 103 notifies the gene analyzing institution 104 of the routing addresses utilizing the Internet, the routing addresses are encrypted, so that they will not be leaked to a third party.

The user 100 wishing his/her genes be analyzed first registers with the billing institution 103 (step 202). Upon registration, the user 100 notifies the billing institution 103 of his/her contact address and credit card number or bank account number. In response, the billing institution 103 completes user registration (step 203), and issues a user ID and, password to the user 100 (step 204). The user 100 receives the user ID and password issued from the billing institution 103 (step 205). In step 205, the billing institution 103 records associatively the user ID, password and other related information in the memory 119. The recorded information is the personal information of the user 100 known to the billing institution 103.

In this manner, the user 100 registers with the billing institution 103 and receives the user ID and password issued from the billing institution 103.

Subsequently, the user 100 submits his/her genes to the gene analyzing institution 104 (step 206). In order to submit the genes, the user 100 may go to the gene analyzing institution 104 in person, so that a sample for gene analysis (gene sample), such as hair, a fragment of skin, of blood, is extracted in the gene analyzing institution 104. Alternatively, the user 100 may submit a gene sample directly. The user 100 pays the regulation charge for the gene analysis when he submits the gene sample. The user 100 merely submits the gene sample and does not notify the gene analyzing institution 104 of his/her personal information. The gene analyzing institution 104 receives the gene sample and the regulation charge (step 207), and in response thereto, issues a secret number corresponding to the gene sample to the user 100 (step 208). The secret number is used as user specific information, and is recorded in the memory 124. It should be noted that the gene analyzing institution 104 issues the secret number to the user 100 upon submission of the gene sample and receipt of the regulation charge without obtaining the personal information of the user 100, such as his/her name and address.

The user 100 receives the issued secret number (step 209). The gene analyzing institution 104 analyzes the submitted gene sample (step 210). The gene analyzing device 112 conducts the gene analysis. The gene analysis information obtained from the gene analysis is recorded in the database server 109 in connection with the secret number issued in step 208 (step 211). Also, related information such as commentaries on the gene analysis information, and advice is recorded in the database server 109 in connection with the secret number issued in step 208.

The gene analyzing institution 104 can merely know the gene analysis information corresponding to a particular secret number, and there is no way to identify an individual with respect to the gene analysis information. Consequently, it is possible to protect privacy of the user 100 against the gene analyzing institution 104.

Next, a procedure that allows the user 100 to obtain his/her gene analysis information through the Internet 102 will be described. As a precondition to start the following procedure, the above steps 200 through 211 have to be completed. It is assumed that all communications described below are made through the Internet 102.

Initially, public keys A, C, GA, and GC used in the communications are described.

The public key A is an encryption key for generating encrypted information which can be decrypted with a private key (decryption key) held only at the billing institution 103. Except for the billing institution 103, it is difficult to decrypt the information encrypted with the public key A since only the billing institution 103 holds the private key, which is a decryption key corresponding to the public key A used as the encryption key. The public key A is an authenticated public key which can be obtained from a reliable certificate authority. Both the user 100 and the gene analyzing institution 104 obtain the public key A from the certificate authority in advance. The private key corresponding to the public key A is recorded in the memory 117.

The public key C is an encryption key for generating encrypted information which can be decrypted with a private key (decryption key) held only by the user 100. Except for the user 100, it is difficult to decrypt the information encrypted with the public key C. The public key C is generated using appropriate cryptographic software. The public key C may not be open to the public, but is notified to the billing institution 103 and the gene analyzing institution 104 from the user 100. The corresponding private key is recorded in the personal computer 101 of the user 100.

The public key GA is an encryption key for generating encrypted information which can be decrypted with a private key held only at the gene analyzing institution 104. The public key GA is notified to the billing institution 103 from the gene analyzing institution 104 in secrecy. Except for the gene analyzing institution 104, it is difficult to decrypt the information encrypted with the public key GA. The public key GA is recorded in the memory 117 of the billing and authentication server 107, and when needed, the billing institution 103 encrypts data to be transmitted with the public key GA recorded in the memory 117. The private key corresponding to the public key GA is recorded in the memory 122. The public key GA is not notified to the user 100. This arrangement aims to lower the risk that the user 100 will know the content of communication encrypted with the public key GA. Preferably, the public key GA is changed periodically since it is used frequently.

The public key GC is an encryption key for generating encrypted information which can be decrypted with a private key held only at the gene analyzing institution 104. The public key GC is notified to the user 100 from the gene analyzing institution 104. Except for the gene analyzing institution 104, it is difficult to decrypt the information encrypted with the public key GC. The public key GC is not notified to the billing institution 103. This arrangement aims to lower the risk that the billing institution 103 will know the content of communication from the user 100 to the gene analyzing institution 104. The private key corresponding to the public key GC is recorded in the memory 122.

When the user 100 wishes to know his/her gene analysis information, he/she accesses the billing institution 103 by connecting the personal computer 101 to the Internet 102 through the Internet service provider 105 (step 212). This is an inquiry about the gene analysis information from the user 100 to the billing institution 103. This access is directed to the address of the billing institution 103.

The user 100 accesses the billing institution 103 with the aforementioned user ID and password received in step 205. To be more concrete, the user 100 encrypts the public key C, user ID and password with the public key A, and transmits the result to the billing institution 103 through the Internet 102. The public key C is notified from the user 100 to the billing institution 103 at this stage since the public key C is not obtainable from a public key server even though it is referred to as public key.

The representation ENC ((user ID+user password+public key C), public key A) indicates information generated by encrypting (user ID+user password+public key C) with the public key A. Decryption of the ENC ((user ID+user password+public key C), public key A) is feasible only at the billing institution 103 that holds the private key corresponding to the public key A, thereby making it possible to protect privacy of the user 100 against a third party.

Upon receipt of the inquiry in step 212, the billing institution 103 confirms the user ID and the user password in the billing and authentication server 107 (step 213). At this point, (user ID+user password+public key C) encrypted with the public key A is decrypted in the cryptographic unit 116 with the private key recorded in the memory 117. The decrypted information is compared with the user ID and the user password recorded in the memory 119 in step 205 in the information processing unit 118. The decrypted public key C is recorded in the memory 117.

Once the user ID and the user password of the user 100 are confirmed, a routing address used later for communication with the gene analyzing institution 104 is selected (step 214). A routing address is selected at random in the address selecting unit 114 of the router 106 from the routing address candidates that are recorded in the memory 115 and are not used at that instance. In this manner, the routing address is selected dynamically irrespective of the user 100. Alternatively, the routing address may be set in any facility other than the billing institution 103.

When the routing address is selected in step 214, the billing institution 103 transmits the selected routing address to the gene analyzing institution 104 (step 215), in which the public key C and the selected routing address are encrypted with the public key GA and then transmitted from the billing institution 103 to the gene analyzing institution 104.

Upon receipt of the ENC ((public key C+routing address), public key GA) (step 216), the gene analyzing institution 104 decrypts the same with the private key (the one corresponding to the public key GA) recorded in the memory 122 in the cryptographic unit 121.

Subsequently, the decrypted information (public key C and routing address) is processed in the information processing unit 123, in which a judgment is made as to whether the routing address transmitted from the billing institution 103 matches with any one of a plurality of routing address candidates stored in the memory 124. If the judgment is true, the gene analyzing institution 104 judges that the user 100 has been authenticated at the billing institution 103. Then, a service ID is set in the gene analyzing institution 104 (step 217). The service ID is recorded in the memory 124 in connection with the routing address received in step 216.

Having set the service ID, the gene analyzing institution 104 transmits both the service ID and the public key GC to the billing institution 103 (step 218) In step 218, the service ID encrypted with the public key A, and the public key GC encrypted with the public key C are transmitted from the gene analyzing institution 104 to the billing institution 103. It should be noted that the transmission is made not to the routing address but to the address of the billing institution 103.

The billing institution 103 receives the service ID and the public key GC (step 219). At this point, since the private key corresponding to the public key A is recorded in the memory 117 of the billing and authentication server 107, the service ID is decrypted in the cryptographic unit 116. However, since the private key corresponding to the public key C is not recorded in the memory 117, the public key GC is not decrypted, and the billing institution 103 cannot know the content thereof. The billing institution 103 records the service ID received in step 219 in the memory 119.

Subsequently, the billing institution 103 transmits the service ID to the user 100, and at the same time, it transfers the public key GC to the user 100 (step 220), in which the service ID is encrypted in the cryptographic unit 116 of the billing institution 103 with the public key C recorded in the memory 117, and then transmitted to the user 100 while no cryptographic is applied to the public key GC in the cryptographic unit 116, and the public key GC transmitted from the gene analyzing institution 104 is transferred to the user 100 intact.

The user 100 receives the information transmitted in step 220 (step 221), and decrypts the service ID and the public key GC encrypted with the public key C by using the private key recorded in the personal computer 101.

The service ID obtained in step 221 allows the user 100 to access the gene analyzing institution 104 through the billing institution 103. Also, the public key GC thus obtained allows the user 100 to transmit information to the gene analyzing institution 104 while making it impossible for the billing institution 103 to know the content thereof.

Subsequently, the user 100 requests an information category (the category of the information he/she wishes to know) (step 222). The information category referred to herein is defined as a category of the gene analysis information the user 100 wishes to obtain, such as his/her gene sequences, information on diseases implicated in the gene analysis information, and diatheses and allergies implicated in the gene analysis information, or a category of information associated with the foregoing.

The user 100 transmits the service ID and the information category encrypted with the public key GC received in step 221 to the billing institution 103 (step 223). Then, the billing institution 103 transfers the same to the gene analyzing institution 104 (step 223). At this point, since the information category is encrypted with the public key GC that makes decryption at the billing institution 103 infeasible, the billing institution 103 cannot know what kind of information the user 100 is requesting.

The information transferred in step 223 is received by the gene analyzing institution 104 (step 224). The information ENC (service ID+information category, public key GC) received by the gene analyzing institution 104 is decrypted in the cryptographic unit 121 with the private key stored in the memory 122. Then, an information providing charge for the information category requested by the user 100 is calculated in the information processing unit 123 (step 225). The information providing charge together with the service ID is encrypted in the cryptographic unit 121 with the public key A recorded in the memory 122, and then transmitted to the billing institution 103 (step 226). Upon receipt of this transmission (step 227), the billing institution 103 decrypts the same in the cryptographic unit 116 with the private key corresponding to the public key A recorded in the memory 117. Then, a bill amount is calculated in the information processing unit 118 by adding a commission to the information providing charge (step 228). Then, the billing institution 103 transmits the bill amount thus calculated to the user 100 (step 229), in which the billing institution 103 encrypts the service ID, the bill amount, and a billing ID with the public key C and sends the result to the user 100. The billing ID referred to herein is defined as an ID for managing the bill amount in the billing institution 103.

Upon receipt of the information transmitted in step 229 (step 230), the user 100 decrypts the content thereof with the private key he/she holds. Then, the user 100 checks the amount received, and decides whether it is acceptable or the user 100 acknowledges it (step 231). In other words, the user 100 decides whether he agrees to pay the bill amount to receive the gene analysis information. If the bill amount is not acceptable to the user 100, or he wishes to request another information category again, the user 100 returns to step 222 and requests the information category again.

If the bill amount is acceptable in step 231, the user 100 notifies the billing institution 103 of his/her acceptance or acknowledgment. In that case, the user 100 encrypts a message stating his/her acceptance of the bill amount and the service ID with the public key A, and transmits the result to the billing institution 103. Upon receipt of this transmission (step 232), the billing institution 103 decrypts the same in the cryptographic unit 116 with the private key recorded in the memory 117. Then, the billing institution 103 judges the acceptance of the bill amount from the user 100 in the information processing unit 118, whereupon it shifts to a communication mode in which the routing address selected in step 214 is used (step 233).

A communication from the user 100 to the gene analyzing institution 104 in the communication mode using the routing address is performed after the following address conversion in the billing institution 103:

FRAM (DA=IPA-A, SA=IPA-C)
→ FRAM (DA=IPA-G, SA=IPA-RR).

Also, a communication from the gene analyzing institution 104 to the user 100 in the communication mode using the routing address is performed after the following address conversion in the billing institution 103:

FRAM (DA=IPA-RR, SA=IPA-G)
→ FRAM (DA=IPA-C, SA=IPA-A).

In the above, FRAM is a frame to be transmitted, DA is a destination address, SA is a source address, IPA-A is an address of the billing institution 103 (the one other than the routing address), IPA-C is an address of the user 100, IPA-G is an address of the gene analyzing institution 104, and IPA-RR is the routing address selected in the billing institution 103.

As to a communication from the user 100 to the gene analyzing institution 104 in the communication mode using the routing address, the user 100 initially communicates with the billing institution 103, and this communication is received at the address of the billing institution 103 (not the routing address, but the address that the billing institution 103 uses for general communications). Then, the billing institution 103 transmits the content of the communication to the gene analyzing institution 104 from the routing address.

As to a communication from the gene analyzing institution 104 to the user 100 using the routing address, a communication from the gene analyzing institution 104 is received by the billing institution 103 at the routing address, and the billing institution 103 transmits this communication to the user 100 not from the routing address, but from the address of its own. At this point, the billing institution 103 merely transfers the frame by changing the address, and does not perform any processing, such as decoding of the content of the communication.

Once the billing institution 103 has shifted to the communication mode using the routing address, it notifies so to the user 100 (step 234). Then, the user 100 confirms that the billing institution 103 and the gene analyzing institution 104 have shifted to the communication mode using the routing address that was dynamically set by the billing institution 103 (step 235). Subsequently, the user 100 transmits the secret number, which was issued from the gene analyzing institution 104 and received in step 209, to the billing institution 103 (step 236). In this step, the secret number and the service ID are encrypted with the public key GC and then transmitted. The transmission from the user 100 in step 236 is received by the billing institution 103 (step 237). The received frame is transmitted to the gene analyzing institution 104 from the routing address (step 238). In this manner, the billing institution 103 performs the frame transfer. This frame transfer operation is conducted at the input/output unit 113 in the router 106.

The gene analyzing institution 104 receives the frame transmitted in step 239 as the one from the routing address of the billing institution 103 (step 239). In the gene analyzing institution 104, the cryptographic unit 121 decrypts the information transmitted from the routing address of the billing institution 103 with the private key corresponding to the public key GC and recorded in the memory 122. Then, the information processing unit 123 compares the decrypted secret number with the one recorded in the memory 124. Simultaneously, the information processing unit 123 confirms the service ID in the frame received in step 240 and the routing address as the source address, and judges further whether the combination matches with the combination of the service ID and the routing address recorded in the memory 124 in step 217.

If the matching of the secret number is confirmed and the judgment is true, the information processing unit 123 retrieves the corresponding gene analysis information from the database server 109. Also, when needed, the information processing unit 123 retrieves commentary information and advice information corresponding to the gene analysis information from the database server 109. Further, the information processing unit 123 may apply secondary processing to the gene analysis information, if necessary.

The gene analyzing institution 104 transmits the gene analysis information or related information from the input/output unit 120 to the routing address of the billing institution 103 (step 240). In step 240, the service ID and the gene analysis information are encrypted with the public key C. This encryption is performed in the cryptographic unit 121 with the public key C recorded in the memory 122. If the above judgment is false, the transmission in step 240 is stopped since there is a likelihood that a spoofing third party is trying to access illegally.

The billing institution 103 receives the information transmitted in step 240 at the routing address (step 241), and transfers the same to the user 100 from its own address (step 242). The user 100 receives the gene analysis information transmitted from the billing institution 103 (step 243). If the user 100 requests the gene analysis information again, the process returns to step 222, and repeats each step starting from requesting the information category. If the user 100 does not request the gene analysis information again, a branch is taken to step 245 from step 244, whereupon the communication is terminated.

The gene analyzing institution 104 records the service ID and the information providing charge calculated in step 225 in the memory 124. The billing institution 103 records the information providing charge and the service ID received in step 227 in the memory 119. The billing institution 103 also records the bill amount and the billing ID transmitted in step 229 in the memory 119. It should be noted that the billing institution 103 does not record any correspondence between the service ID and the billing ID. This arrangement aims to prevent an unwanted incident that the correspondence between the service ID and the billing ID is leaked to the outside by any chance and the user 100 is identified at the gene analyzing institution 104.

After a series of communications end, the gene analyzing institution 104 bills the billing institution 103 for the information providing charge by specifying the service ID. The billing institution 103 confirms the billed information providing charge, and pays the same to the gene analyzing institution 104.

The billing institution 103 confirms the bill amount corresponding to the billing ID, and bills the user 100 for the bill amount. The user 100 pays the bill amount to the billing institution 103 by a credit card, direct debit from a user's account, or remittance to a billing institution's account.

Thus, the user 100 obtains the requested gene analysis information through the Internet. The billing institution 103 earns commissions by serving as an intermediate agency in providing the gene analysis information to the user 100, while the gene analyzing institution 104 receives charges for the gene analysis and the provision of gene analysis information.

According to the present embodiment, the privacy of the user 100 as to his/her gene analysis information is kept protected perfectly.

First, the billing institution 103 can identify the user 100, but it can know neither the content of the information category requested by the user 100 nor the content of the gene analysis information transmitted from the gene analyzing institution 104. To be more concrete, in step 222, the user 100 transmits the information category to the billing institution 103, but the decryption of the information category is infeasible at the billing institution 103, and therefore, the billing institution 103 cannot know the content thereof. In particular, the public key GC that the user 100 used in encrypting the information category had been encrypted with the public key C and transmitted from the gene analyzing institution 104 in step 218, so that the billing institution 103 cannot know the public key GC itself. If the content of the information category is composed of a plain text having limited variations, there would be an increased risk that it is deciphered based on the public key. However, by keeping the public key confidential as described above, it is possible to strongly prevent the content of the information category from being known to the billing institution 103.

Also, in step 227, the billing institution 103 receives the information providing charge calculated by the gene analyzing institution 104, and can know the details thereof. However, the billing institution 103 can merely know the charge, and it cannot know what kind of gene analysis information the user 100 has requested.

Also, the gene analysis information received in step 241 is encrypted with the public key C, which the billing institution 103 cannot decrypt, and therefore, cannot know the content thereof.

On the other hand, the gene analyzing institution 104 knows which category of gene analysis information was handled. However, it cannot know who requested the information and to whom the information was transmitted. To be more concrete, the gene analyzing institution 104 receives the service ID and the information category in step 224, so that it can know a relationship between the service ID and the requested information category. However, the service ID has been set arbitrarily by the gene analyzing institution 104 in step 217 in connection with the routing address notified from the billing institution 103, and the routing address has been selected arbitrarily by the billing institution 103 from the candidates prepared in advance, so that the user 100 cannot be identified. Hence, the gene analyzing institution 104 cannot know who requested the information category received in step 224.

Also, the gene analyzing institution 104 receives the secret number in step 239, so that it can retrieve the corresponding gene analysis information. However, the secret number has been issued to the user 100 in step 208 in exchange for the submission of genes and the payment of the analysis charge without confirming his/her personal information, and it is impossible to identify an individual user from the secret number. Hence, the gene analyzing institution 104 cannot know whose gene analysis information it is. Also, the secret number received in step 230 has been transmitted from the routing address, which does not provide any personal information to identify the user 100 (the individual user cannot be identified from the routing address).

Also, in step 239, the gene analyzing institution 104 confirms the combination of the service ID and the routing address of the source stored in step 217, and therefore, it is possible to prevent the information from being provided erroneously in response to an illegal access by a third party. In other words, the routing address is selected dynamically for each inquiry from the user 100, and the service ID is assigned to each routing address, which makes it difficult for a third party to find out the combination of the routing address and the service ID corresponding to the user 100, thereby making an illegal access difficult.

According to the present embodiment, it is possible to receive a gene analysis information service that ensures anonymity and is conveniently accessible through the Internet. Consequently, the user can casually access to his/her gene analysis information without worrying about leakage of his/her privacy, which promotes the utilization of his/her gene analysis information in daily life, and boosts an expansion of gene analysis information providing business. while, in the present embodiment, the billing institution 103 includes the router 106 and the billing and authentication server 107, other devices may be adopted as long as the same functions are implemented. This is also true for the gene analyzing institution 104.

Also, while the cryptographic units 116, 121 and the information processing units 118, 123 have been explained as separate functional units, these are typically integrated in a single hardware unit, and each function is implemented by software in the hardware unit. It is needless to say, however, that these units may be implemented by separate hardware units. Similarly, while the memories 117 and 119, and the memories 122 and 124 have been explained as being present separately, a single memory may be used commonly. The memory may be any of a semiconductor memory, a magnetic recording medium, etc. The memory may also be an external storage device.

The personal computer 101 of the user 100 may be an electric household appliance that can access to the Internet, a portable information processing terminal, or a cellular phone that can access to the Internet. Also, the personal computer 101 of the user 100 is not limited to the one owned by the user, and it may be a computer owned by some other or the one installed at a public facility.

Besides the gene analysis information, information as to whether the user has become infected with some virus, information on the results of medical checkups that the user wishes to keep confidential, information on personality and/or psychoanalysis, etc., can be handled in the same manner. In addition, commentaries and/or advice on the foregoing information can be handled as well.

Also, in the present embodiment, physical characteristics of the user 100 may be registered in the gene analyzing institution 104 instead of or in addition to the secret number. In that case, information on the physical characteristics is transmitted instead of or in addition to the secret number in step 236. The gene analyzing institution 104 compares the content of the transmission with the pre-registered information to specify gene analysis information requested.

The physical characteristics may be irises, fingerprints, voiceprints, mole locations, row of teeth, frame, or any arbitrary combination thereof. When this method is used, the personal computer 101 of the user 100 is equipped with a camera, a scanner, or a voice recognition apparatus, and the above information is transmitted through the Internet. This method makes it more difficult for anyone but the user 100 to access the gene analysis information of the user 100.

(Second Embodiment)

The present embodiment relates to a gene analysis information providing method that will be realized when the gene analysis information can be associated with the physical characteristics of an individual seen from his/her appearance in a one to one correspondence in the future.

In the present embodiment, data on the physical characteristics (for example, irises) is used as user specific information, which can identify the user and is transmitted from the user through the Internet.

An example of implementing the present embodiment will next be described. The basic flow of the process for providing the gene analysis information is the same as the one described in the first embodiment, and differences from the first embodiment will be mainly described. The following example assumes that the irises are used as the physical characteristics.

In the present embodiment, the personal computer 101 of the user 100 is equipped with a camera for photographing the irises. In the gene analyzing institution 104, the access server 108 is furnished with a function of comparing the gene analysis information recorded in the database server 109 with the received image information of the irises to judge whether the same individual can be identified from these two kinds of information.

Steps 200 through 205 are the same as those in the first embodiment. In the present embodiment, the user submits his/her genes using a special envelope (corresponding to step 206). This special envelope is assigned with a serial number and is available at a convenience store or the gene analyzing institution 104. The user 100 puts his/her gene sample (for example, hair) into this special envelope and mails the same to the gene analyzing institution 104. The user 100 sends the gene sample in an anonymous mail without writing his/her name and address on the envelope.

Upon receipt of the mailed envelope (corresponding to step 207), the gene analyzing institution 104 conducts gene analysis with the gene analysis sample enclosed therein (step 210), and records the analysis result (step 211). In the present embodiment, operations corresponding to steps 208 and 209 are omitted.

When the user 100 accesses his/her genetic information, he/she transmits the serial number assigned to the envelope in step 212. The cryptographic technique used is the same as the one used in the first embodiment. Thereafter, step 213 through step 235 are performed successively. In the present embodiment, in step 236, the user 100 transmits image information of his/her irises captured by the personal computer 101 instead of the secret number. The image information is transferred from the billing institution 103 (corresponding to steps 237 and 238) and received by the gene analyzing institution 104 (corresponding to step 239). The gene analyzing institution 104 compares the received image information of irises with the image information of irises obtained from the recorded gene analysis information, and identifies the gene analysis information corresponding to the received image information of irises. Then, the gene analyzing institution 104 transmits the identified gene analysis information to the routing address of the billing institution 103 (corresponding to step 240). Thereafter, the same steps as those described in the first embodiment are performed.

According to this embodiment, the user 100 does not have to go to the gene analyzing institution 104 in person, so that anxiety the user 100 may feel and hesitation he may have in going to the gene analyzing institution 104 in person can be lessened. Hence, the user 100 can use the gene analysis information providing service more casually and easily.

Besides the irises, fingerprints, voiceprints or the like may be used as the physical information for identifying the user (the physical information has to be the one that can be extracted from the gene analysis information). Also, it is anticipated that, in the future, the user 100 will be able to obtain his/her gene analysis information sufficient to identify him/herself, and such gene analysis information may be used as the physical characteristics.

While the present invention has been specifically described with respect to the preferred embodiments thereof, it is not limited to such embodiments, and can be modified in various manners without deviating the scope thereof.

Figure 9:
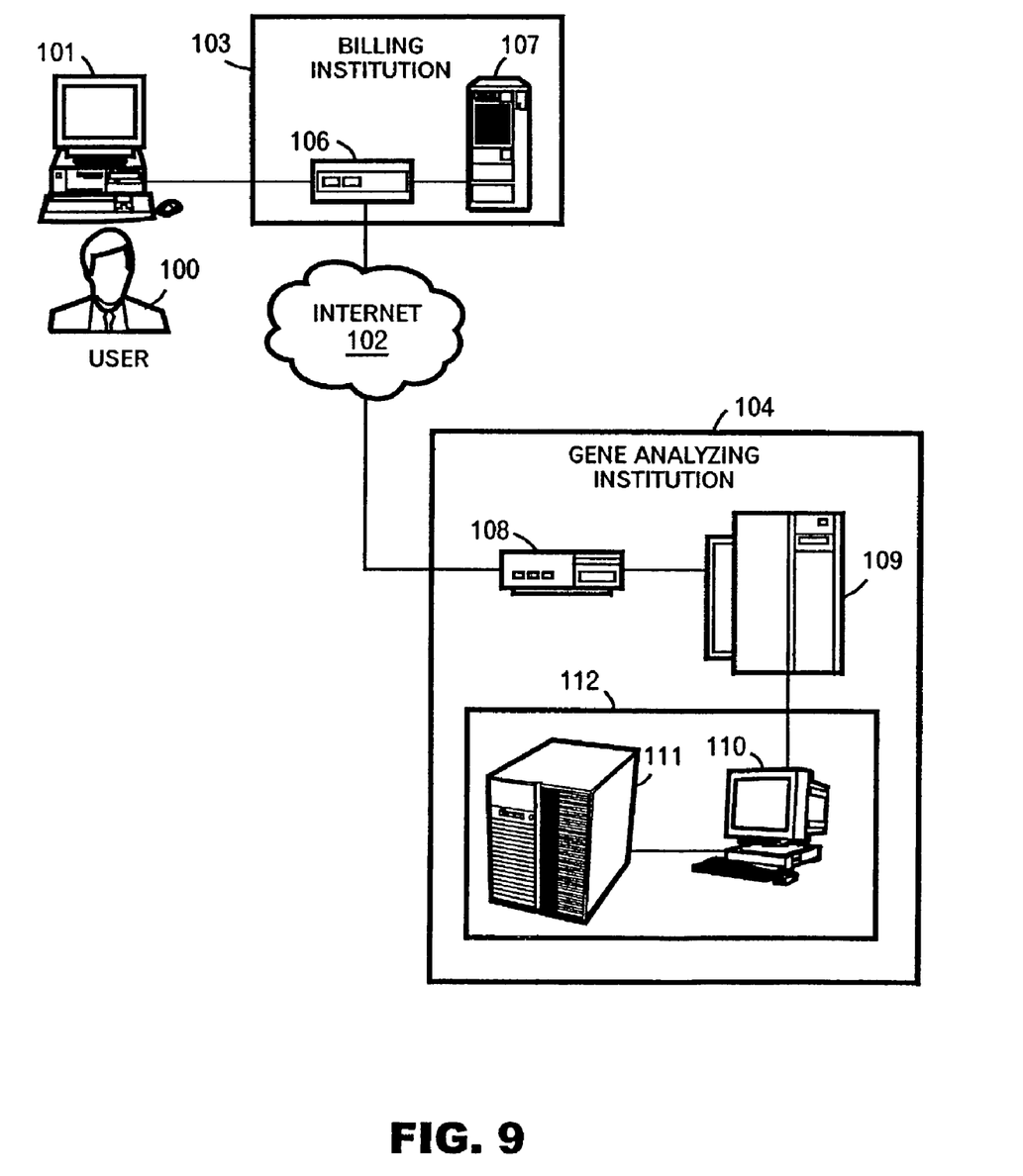
FIG. 9 is a view explaining an example according to another embodiment of the invention.

FIG. 9 is a view explaining one example according to another embodiment of the invention. According to the example shown in FIG. 9, the billing institution 103 is directly connected to the personal computer 101. In this example, the personal computer 101 is installed at the billing institution 103, so that the user 100 goes to the billing institution 103 and operates the personal computer 101 to accesses his/her gene analysis information.

Figure 10:
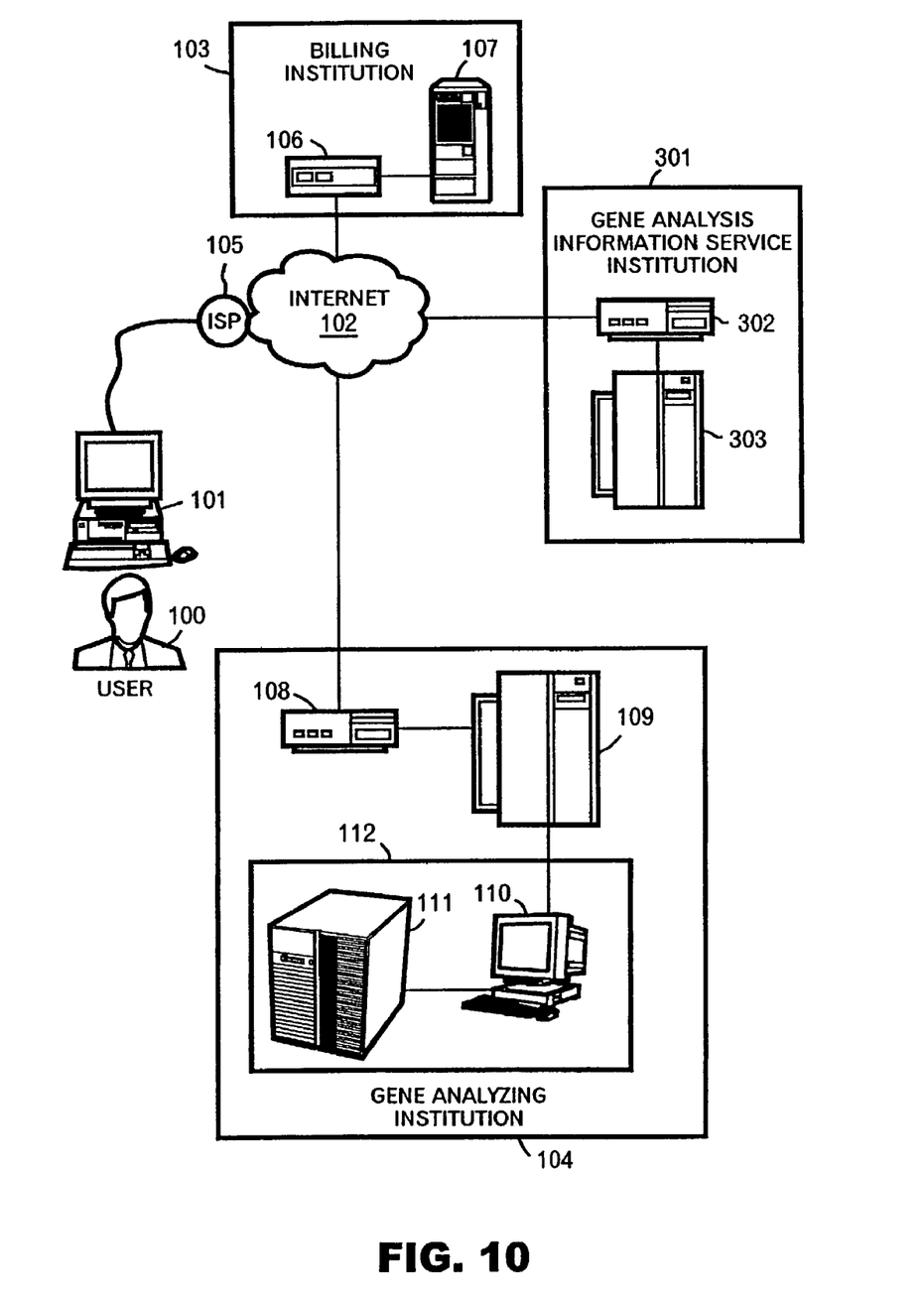
FIG. 10 is a view explaining an example according to a further embodiment of the invention.

FIG. 10 is a view explaining one example according to a further embodiment of the invention. The gene analysis information may include information on diatheses, such as predisposition to some disease (such as hypertension or diabetes), predisposition to gain weight or swell, sensitive skin, vulnerability to alcohol, and information on personality and aptitude (it is needless to say that some are acquired and not all the foregoing are determined by the gene analysis information.)

The user 100 may wish to have medical advice or advice on daily life with respect to the foregoing information, or the user 100 may wish to have information or advice on predictable physical or mental gene causing changes under certain situations or environments, or on appropriate ways to handle such changes.

It is quite a burden on the gene analyzing institution 104 to prepare such information or advice, and this task might deviate from its intended operations. FIG. 10 shows a case where a service of providing the foregoing information or advice is carried out by a separate special institution.

In this case, the gene analyzing institution 104 conducts gene analysis, and records the analysis results in the database server 109 in connection with the secret number. A gene analysis information service institution 301 pays a predetermined charge to the gene analyzing institution 104 to obtain the gene analysis information and the corresponding secret number through the Internet 102. The gene analysis information service institution 301 analyses the obtained gene analysis information, and prepares various kinds of service information. This operation is conducted by a server 302, and the results are recorded in a database server 303.

The billing institution 103 makes communications through the Internet 102 between the personal computer 101 operated by the user 100 and the gene analysis information service institution 301, whereby it provides the user 100 with an information providing service offered from the gene analysis information service institution 301.

Communications among three parties, that is, the user 100, the billing institution 103, and the gene analysis information service institution 301, are made in the same manner as in the first embodiment except that the gene analyzing institution 104 is replaced with the gene analysis information service institution 301.

Figure 11:
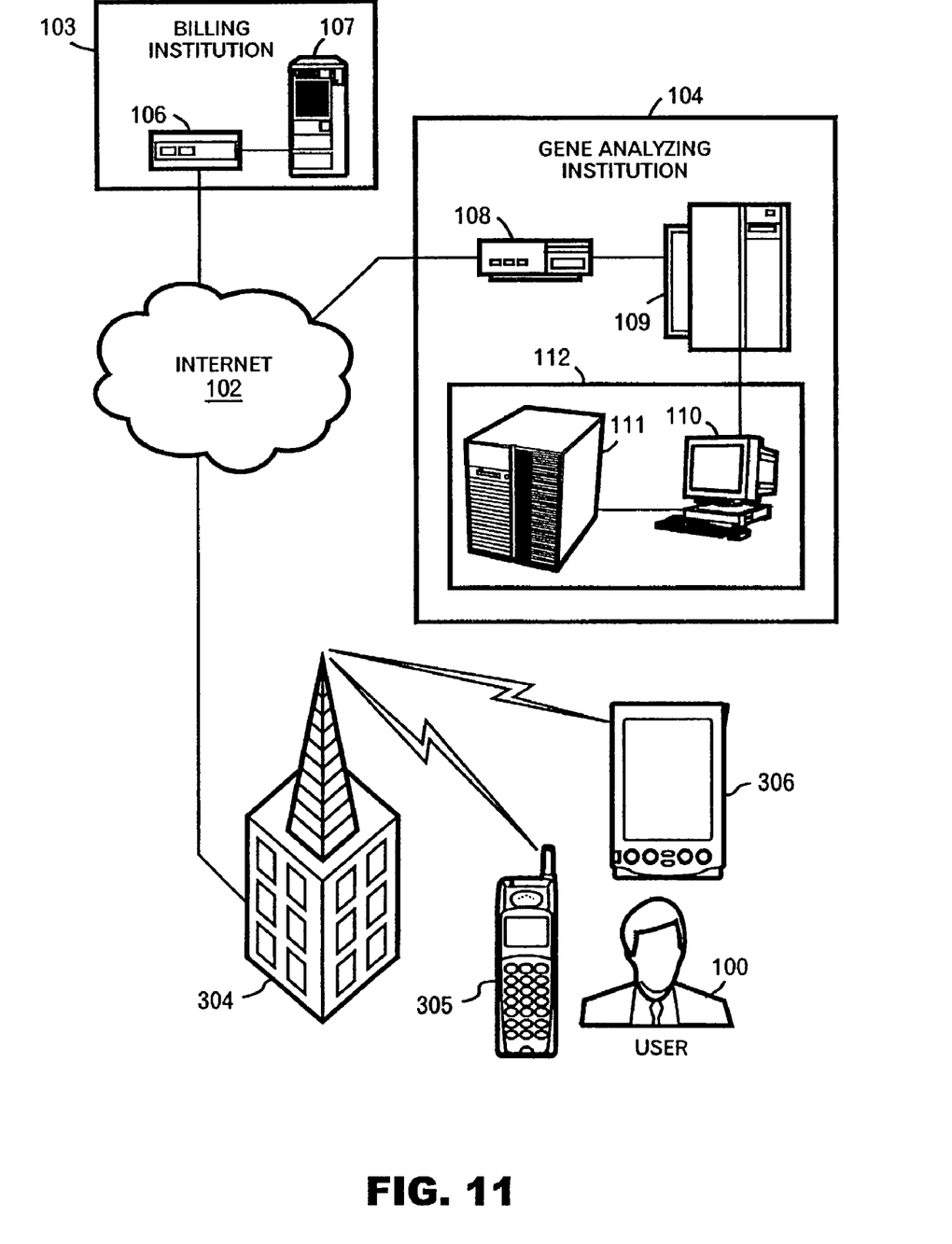
FIG. 11 is a view explaining an example according to still another embodiment of the invention.

FIG. 11 is a view explaining one example according to still another embodiment of the invention. FIG. 11 shows a case where the gene analysis information providing service is available with a cellular phone 305 or a portable information processing terminal 306. The basic scheme is the same as the one explained in the first embodiment except that the user 100 accesses his/her gene analysis information by operating the cellular phone 305 or portable information processing terminal 306 via a mobile communication service company 304 linked to the Internet 102. Alternatively, an gene analysis information service institution may be established separately as shown in FIG. 10, so that it provides the information to the cellular phone 305 or portable information processing terminal 306.

ADVANTAGES OF THE INVENTION

According to the present invention, an information providing method for allowing a user to obtain information he/she wishes to keep confidential while protecting his/her privacy is provided. Also, an information providing method for making it impossible to relate a user to the content of gene analysis information or related service that the user received is provided. Further, an information providing system implementing these methods and a computer executable program for implementing these methods are provided.

The invention claimed is:

1. An information providing method comprising the steps of:
   receiving user specific information by way of a routing address selected dynamically from a plurality of addresses determined in advance with a relay institution;
   encrypting information corresponding to said user specific information with a first encryption key corresponding to a first decryption key held by a user; and
   transmitting said encrypted information to said routing address.

2. The information providing method according to claim 1, further comprising the steps of:
   encrypting a second encryption key corresponding to a self-held second decryption key with said first encryption key;
   transmitting said second encryption key encrypted to said user by way of said relay institution; and
   receiving an information category requested by said user with respect to said information, said information category or said user specific information being encrypted with said second encryption key.

3. The information providing method according to claim 1, further comprising the steps of:
   receiving said routing address transmitted from said relay institution; setting a service ID corresponding to said routing address;
   transmitting said service ID to said user by way of said relay institution; receiving said user specific information and said service ID;
   judging whether a combination of the routing address through which said user specific information was transmitted and the service ID received simultaneously with said user specific information matches with a combination of the routing address transmitted from said relay institution and the service ID set correspondingly with said routing address transmitted; and
   stopping the transmission of said information if said judgment is false.

4. The information providing method according to claim 1, wherein said user specific information is a secret number issued to said user.

5. The information providing method according to claim 1, wherein said user specific information is physical characteristics data of said user, and said method further comprises the steps of:
receiving data on physical characteristics that can be delivered by an electronic method or in an electronic form;
judging whether said data received matches with pre-registered physical characteristics data of said user or physical characteristics data obtained from a sample extracted from said user;
and authenticating said physical characteristics data as said user specific information if said judgment is true.

6. An information providing method comprising the steps of:
receiving an inquiry about information from a user;
selecting a routing address from a plurality of addresses determined in advance with an information providing institution that provides said information;
receiving said information transmitted from said information providing institution at said routing address; and
transferring said information received at said routing address to said user.

7. The information providing method according to claim 6, wherein said information received at said routing address is encrypted with a first encryption key corresponding to a first decryption key held by said user.

8. The information providing method according to claim 6, further comprising the steps of:
receiving user specific information transmitted from said user; and
transferring said user specific information to said information providing institution by way of said routing address, said user specific information being encrypted with a second encryption key corresponding to a second decryption key held at said information providing institution.

9. The information providing method according to claim 6, further comprising the steps of:
receiving an information category transmitted from and requested by said user with respect to said information;
transferring said information category to said information providing institution;
receiving a charge amount for said information category transmitted from said information providing institution;
calculating a bill amount charged on said user by adding a commission to said charge amount; and
transmitting said bill amount to said user, said information category being encrypted with a second encryption key corresponding to a second decryption key held at said information providing institution.

10. An information providing method implemented in an information providing system including a user who is to be provided with information, an information providing institution for providing said information, and a relay institution for relaying communications between said user and said information providing institution, said method comprising the steps of:
receiving an inquiry about said information from said user at said relay institution;
selecting a routing address from a plurality of addresses which said relay institution and said information providing institution have agreed on in advance;
transmitting user specific information from said user to said information providing institution via said routing address of said relay institution;
selecting information corresponding to said user specific information in said information providing institution; and
transmitting said information from said information providing institution to said user via said routing address, said user specific information being encrypted with a second encryption key corresponding to a second decryption key held by said information providing institution, said information being encrypted with a first encryption key corresponding to a first decryption key held by said user.

11. An information providing system comprising:
means for receiving user specific information by way of a routing address selected dynamically from a plurality of addresses determined in advance with a relay institution;
means for encrypting information corresponding to said user specific information with a first encryption key corresponding to a first decryption key held by a user; and
means for transmitting said encrypted information to said routing address.

12. The information providing system according to claim 11, further comprising:
means for encrypting a second encryption key corresponding to a self-held second decryption key with said first encryption key;
means for transmitting said second encryption key encrypted to said user by way of said relay institution; and
means for receiving an information category requested by said user with respect to said information, said information category or said user specific information being encrypted with said second encryption key.

13. The information providing system according to claim 11, further comprising:
means for receiving said routing address transmitted from said relay institution;
means for setting a service ID corresponding to said routing address;
means for transmitting said service ID to said user by way of said relay institution;
means for receiving said user specific information and said service ID;
means for judging whether a combination of the routing address through which said user specific information was transmitted and the service ID received simultaneously with said user specific information matches with a combination of the routing address transmitted from said relay institution and the service ID set correspondingly with said routing address transmitted; and
means for stopping the transmission of said information if said judgment is false.

14. The information providing system according to claim 11, wherein said user specific information is a secret number assigned to said user.

15. The information providing system according to claim 11, wherein said user specific information is physical characteristics data of said user, and wherein said system further comprises:
means for receiving data on physical characteristics that can be delivered by an electronic method or in an electronic form;

means for judging whether said data received matches with pre-registered physical characteristics data of said user or physical characteristics data obtained from a sample extracted from said user; and means for authenticating said physical characteristics data as said user specific information if said judgment is true.

16. An information providing system, comprising:

means for receiving an inquiry about information from a user;

means for selecting a routing address from a plurality of addresses determined in advance with an information providing institution that provides said information;

means for receiving said information transmitted from said information providing institution at said routing address; and means for transferring said information received at said routing address to said user.

17. The information providing system according to claim 16, wherein said information received at said routing address is encrypted with a first encryption key corresponding to a first decryption key held by said user.

18. The information providing system according to claim 16, further comprising:

means for receiving user specific information transmitted from said user; and means for transferring said user specific information to said information providing institution by way of said routing address, said user specific information being encrypted with a second encryption key corresponding to a second decryption key held at said information providing institution.

19. The information providing system according to claim 16, further comprising:

means for receiving an information category transmitted from and requested by said user with respect to said information;

means for transferring said information category to said information providing institution;

means for receiving a charge amount for said information category transmitted from said information providing institution;

means for calculating a bill amount charged on said user by adding a commission to said charge amount; and means for transmitting said bill amount to said user, said information category being encrypted with a second encryption key corresponding to a second decryption key held at said information providing institution.

20. An information providing system, including:

a user who is to be provided with information;

an information providing institution for providing said information;

a relay institution for relaying communications between said user and said information providing institution;

means for receiving an inquiry about said information from said user at said relay institution;

means for selecting a routing address from a plurality of addresses which said relay institution and said information providing institution have agreed on in advance;

means for transmitting user specific information from said user to said information providing institution via said routing address of said relay institution;

means for selecting information corresponding to said user specific information in said information providing institution; and means for transmitting said information from said information providing institution to said user via said routing address, said user specific information being encrypted with a second encryption key corresponding to a second decryption key held by said information providing institution, said information being encrypted with a first encryption key corresponding to a first decryption key held by said user.

21. A computer executable program which, when executed, makes a computer perform the functions of:

receiving user specific information by way of a routing address selected dynamically from a plurality of addresses determined in advance with a relay institution;

encrypting information corresponding to said user specific information with a first encryption key corresponding to a first decryption key held by a user; and transmitting said encrypted information to said routing address.

22. A computer executable program which, when executed, makes a computer perform the functions of:

receiving an inquiry about information from a user selecting a routing address from a plurality of addresses determined in advance with an information providing institution that provides said information;

receiving said information transmitted from said information providing institution at said routing address; and transferring said information received at said routing address to said user.

* * * * *